Figure 5:
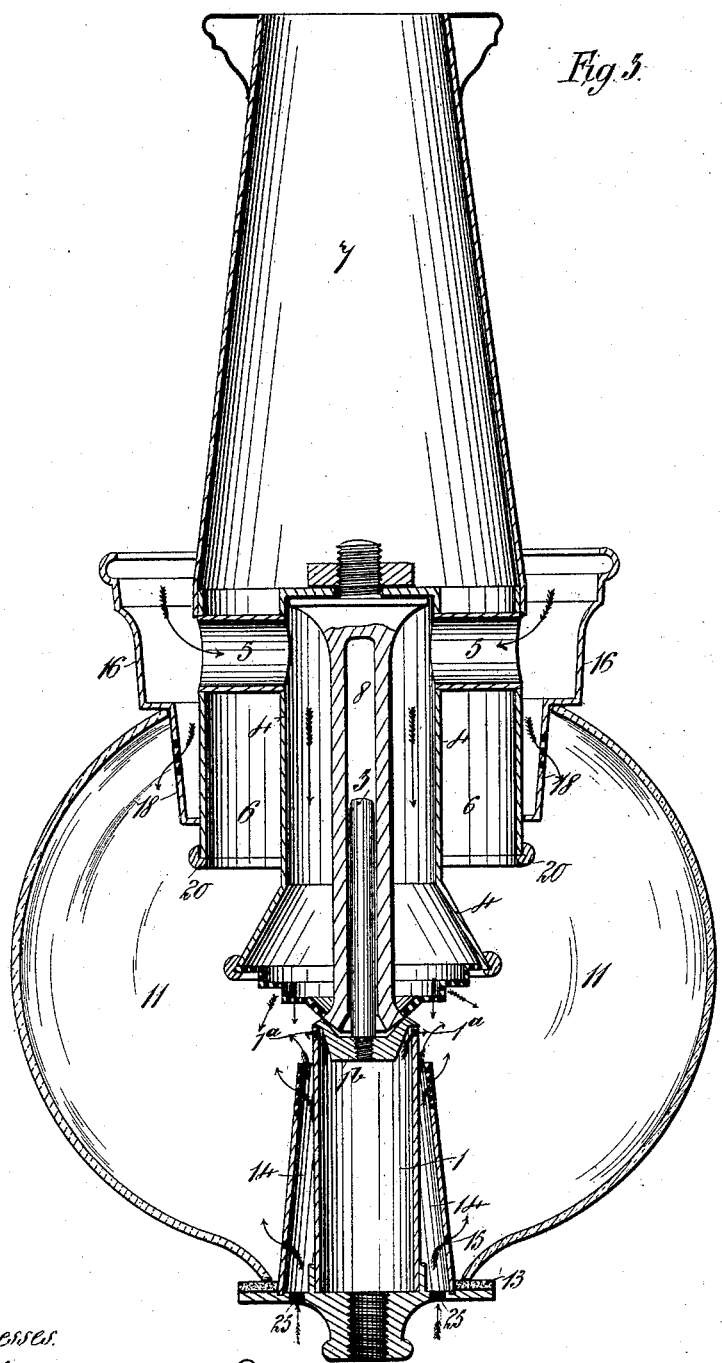

(No Model.)　　　　　T. C. J. THOMAS.　　　3 Sheets—Sheet 1.
LAMP.
No. 477,081.　　　　　　　Patented June 14, 1892.
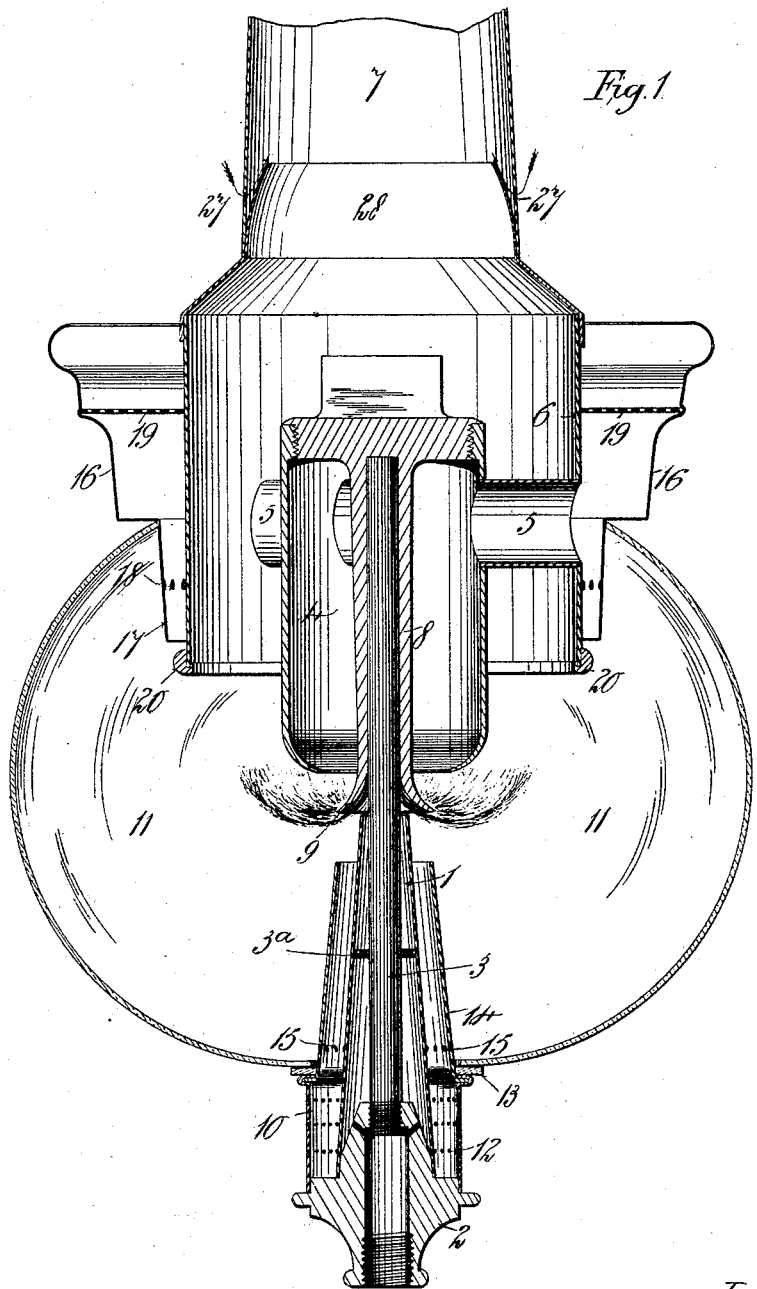
Witnesses
James Stompson Macdonald
Inventor:
T. C. J. Thomas (No Model.)  T. C. J. THOMAS.  3 Sheets—Sheet 2.
LAMP.
No. 477,081.  Patented June 14, 1892.
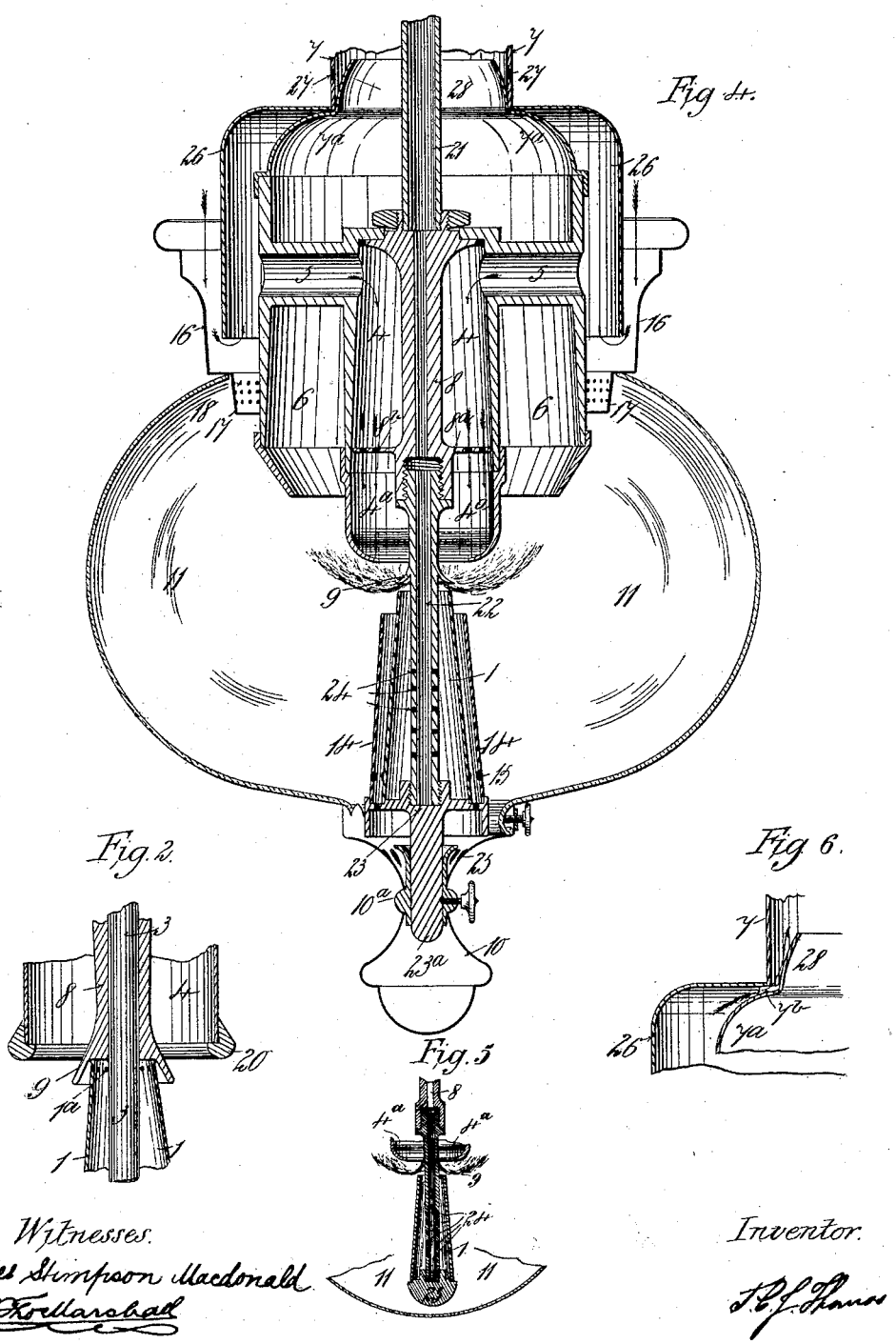

(No Model.) 3 Sheets—Sheet 3.

T. C. J. THOMAS.
LAMP.

No. 477,081. Patented June 14, 1892.

Witnesses.
James Stimpson Macdonald
Wm Thos Marshall

Inventor.
T. C. J. Thomas

UNITED STATES PATENT OFFICE.

THOMAS COOPER JOHN THOMAS, OF LONDON, ENGLAND.

LAMP.

SPECIFICATION forming part of Letters Patent No. 477,081, dated June 14, 1892.

Application filed March 10, 1890. Serial No. 343,341. (No model.) Patented in England November 25, 1887, No. 16,247; in France November 6, 1888, No. 193,941, and in Belgium November 7, 1888, No. 83,872.

*To all whom it may concern:*

Be it known that I, THOMAS COOPER JOHN THOMAS, a subject of the Queen of Great Britain and Ireland, residing at Finsbury Park, in the county of Middlesex, England, have invented Improvements in Lamps, (for which I have obtained Letters Patent in Great Britain, dated November 25, 1887, No. 16,247; in France, dated November 6, 1888, No. 193,941, and in Belgium, dated November 7, 1888, No. 83,872,) of which the following is a specification.

This invention has reference to what are known as "regenerative" lamps. It can be applied in lamps for burning gas or lamps for burning vegetable or mineral oils, and has for its principal object to produce an efficient, strong, and inexpensive lamp of the kind in which the regenerator or air-heating apparatus is firmly supported in proper position in relation to the burner, but in such a manner, nevertheless, that it can be readily removed and replaced as desired, and so that no part of its weight rests upon the glass or globe that surrounds or incloses the burner.

The invention also has for objects to provide an improved construction and arrangement of deflector for deflecting the gas issuing from the burner and to protect the gas outlet or outlets from becoming choked with scale or dirt.

The burner may advantageously be of the Argand type, with or without central air-passage and with the gas-orifices vertical, horizontal, or inclined, or with a vertical annular gas-outlet; but other analogous forms of burner may be employed, and air may be admitted to both sides of the flame or sheet or sheets of gas or to one side thereof only.

In order that this invention may be clearly understood, reference is made to the accompanying drawings, in which—

Figure 1 is a central vertical section of a lamp adapted to be supported by a pedestal or the like below and provided with a regenerator made readily removable to afford access to the burner. Fig. 2 is a sectional detail view illustrating a modified construction. Fig. 3 is a vertical section illustrating a further modified construction of lamp. Fig. 4 is a vertical section of a lamp adapted to be suspended, being carried by a support arranged above instead of below it. In this lamp the regenerator is not supported by a rod in such a way that it can be removed by simply raising it, as in the lamp illustrated in Fig. 1. Figs. 5 and 6 are sectional detail views illustrating modifications hereinafter referred to.

Referring to Fig. 1 of the drawings, 1 is a burner in the form of a tube that may advantageously be a hollow truncated cone, as shown. This burner is open at the top to afford a free annular gas-passage not liable to become choked and at its lower end is secured to a part 2, hereinafter called for distinction the "base." The base in the example is made with a screw-threaded socket that is adapted to be connected by screwing to the tubular end of a pedestal, pillar, bracket, gasalier, or other support through which the gas-supply can pass. As shown, the base 2 is made with a nozzle-shaped upper portion which is perforated for the passage of gas into the burner. 3 is a rod secured to and projecting upward from the base 2 and through the burner 1. $3^a$ is a perforated plate secured to the interior of the burner and serving as a lateral support or stay between the burner and the rod 3. 4 is a chamber having a contracted open lower end and connected by air-inlet tubes 5 to a cylindrical casing 6, which forms the lower part of a chimney of which 7 is the upper and narrower part. The parts 4, 5, and 6 constitute the regenerator. It is constructed with a central socket or cap 8, which may for convenience of manufacture be made as a separate part and be secured to the chamber 4, as in the example shown. The socket or cap 8 fits on the rod 3, which is thus made to support and take the weight of the regenerator, so that no part of such weight rests either upon the burner 1 or upon the glass bowl or globe. With this construction it will be seen that the regenerator, together with the chimney and cover 16, hereinafter described, can be readily lifted clear of the burner and globe for the purpose of lighting the lamp or for other purpose and afterward be replaced, the regenerator being so supported that light is not obstructed by rods, arms, or other supports outside the flame; also, that should the globe be broken the whole of the other parts will nevertheless retain their places. A gas governor or regulating device of any suitable construction can be interposed between the base 2 and the pedestal or other support below it. 9 is a deflector attached to and removable with the regenerator. This deflector is adapted to deflect laterally and downward the gas that issues from the burner 1. This deflector is so formed and is arranged above the burner in such a manner as also to serve as a cover or shield to the burner for preventing entrance of scale or dirt, and consequent choking of the gas-passages. This deflector is shown as made of a bell-mouthed form; but it may be of other shape, such as the truncated conical forms shown in Fig. 2. Its upper and outer surface is curved or inclined outward and downward, as shown, to aid in deflecting heated air as it issues from the regenerator upon the upper side of the flame. The deflector is shown as made in one piece with the socket or cap 8; but, as will be obvious, it may be made separate therefrom and be secured thereto. 10 is a gallery carried by the base 2. It serves to support the glass bowl or globe 11, which rests in the example upon a ring or washer 13 of packing material, such as asbestus. The gallery 10 surrounds the lower part of the burner 1, so as to form an annular air-chamber, into which air can enter through holes 12 in the gallery. 14 is a tube forming an upward continuation of the air-chamber around the burner. Part of the air entering this annular air-chamber passes into the globe and to the under and outer side of the flame through the upper open end of the tube 14, and part passes by openings 15 in the tube 14 into the lower part of the globe for the purpose of keeping the same cool. The air-tube 14 may be dispensed with; but I consider its use advantageous, because the air passing through this tube serves to keep cool the burner 1 and the gas passing through the burner; also, the tube 14 helps to impart a desirable form to the flame. 16 is a light cover that surrounds the regenerator, as also the casing 6, and rests upon the globe, the upper opening in which it closes. This cover serves to direct air through the inlet-tubes 5 to the chamber 4 of the regenerator, and is preferably formed with a depending portion, the bottom of which fits round the outside of the casing 6 and is made with holes 18 for admitting a further supply of air to the globe to keep the upper portion of the same cool and clear and to assist in carrying off the products of combustion through the chimney. The cover 16 is provided with a perforated plate or diaphragm 19, that serves to break up the air passing to the inlet-tubes 5, and thus insures a steady flame. As will be seen, the cover 16 will adapt itself to the height of the globe. 20 is an annular ridge or projection around the lower end of the casing 6 for the purpose of strengthening the same. It also serves to arrest the descent of the cover 16, the bottom of which will rest upon the said ridge 20 should the globe break. The cover can be made to serve as a reflector.

In Fig. 2 there is formed around the open lower end of the central socket 8 an annular surface that constitutes a valve surrounded by a deflector 9 of truncated conical form. This valve is arranged to close the upper open end of the burner 1, which in this case is formed with a row of lateral holes $1^a$ for egress of gas within the deflector.

Fig. 3 shows another way of supporting the removable regenerator 4. In this arrangement the burner-tube 1 is of cylindrical form, and is closed at its upper end by a cover $1^b$, below which is a circular row of holes $1^a$ for the outlet of gas. To this cover $1^b$ is secured the upwardly-extending rod 3, which enters the hollow central support or socket 9, the lower end of which in this arrangement is made of inverted conical form and rests upon, so as to be supported by, the upper part of the cover $1^b$, which is preferably made in the form of a conical socket or cup to receive it. The rod 3 in this case serves to maintain the regenerator in a vertical position and prevents it falling, but not to support the regenerator. The lower end of the air-heating chamber 4 is shown enlarged in Fig. 3, and to it is secured a reticulated plate made in the stepped form shown in order to provide a large outlet area for the passage of heated air and to cause the streams of air to cross each other and thus become broken up. The air-pressure is thus rendered approximately uniform upon the whole of the upper or inner surface of the flame, and the form thereof is consequently maintained approximately constant.

In the construction of lamp shown in Fig. 4, which is adapted to be suspended instead of being supported from below, the base 23, which carries the burner and other parts, is connected to the central socket 8 of the regenerator by means of a pipe 22, which is fixed to the base, and which pipe at its upper end is screwed into the socket 8. A gas-supply pipe 21 passes through the chimney 7 and is connected at its lower end to the central socket 8. The pipe 22 occupies the same position within the conical burner-tube 1 that is occupied by the rod 3 in the lamp illustrated in Fig. 1. The deflector 9 surrounds the pipe 22 and is located above the upper open end of the burner in a manner similar to that hereinbefore described with reference to Fig. 1 and for the same purpose. The pipe 22 is closed at its lower end by the base 23; also, the said pipe is formed with a number of lateral holes 24, through which gas can freely pass into the burner. To this end I make the holes somewhat numerous and large, as shown, and I so arrange them as to leave ample space within the lower part of the burner for the reception of deposit without choking the holes or any considerable proportion of them. In the example twenty holes are supposed to be provided, arranged in four vertical rows, two of which rows are shown in the drawings. By this arrangement I obviate liability to choking of the gas-supply by accumulation of dirt or scale within the burner. The base 23 serves to carry the burner 1 and also the surrounding air-tube 14 when this tube is employed. The central socket-pipe 8 is formed with arms or with a flange 8ª, that takes against the inner surface of the central air-heating chamber of the regenerator and maintains the same in proper position. It is advantageous to use a flange and to form the same with numerous perforations 8ᵇ, that serve to break up the air-supply on its way to the burner. The lower end of the air-heating chamber may be contracted and be provided with an upwardly-extending perforated flange, as shown in dotted lines, to aid in regulating the flow of air to the burner. 10 is a removable gallery for carrying the globe 11. It has fixed to it a tubular part 10ª, adapted to slide upon and be secured to an extension 23ª of the base 23, and is formed with inlet-passages 25 for air that passes to the tube 14 and thence to the flame and globe, as in Fig. 1. 16 is a light annular perforated cover, as before. In conjunction with this cover 16, which, as in Fig. 1, is open at its top, there may be used a curtain 26, so arranged as to cause air to first descend within the cover and then to rise within the curtain, as indicated by arrows, on its way to the regenerator. In this case the perforated plate 19, Fig. 1, is dispensed with. The lower and larger part 6 of the chimney in this arrangement is cast in one piece with the heating-chamber 4 and inlet-pipes 5, and between it and the upper part 7 of the chimney there is interposed a dome-shaped case 7ª, upon which the inwardly-turned upper edge of the curtain 26 can rest, as shown.

The arrangement of central gas-supply pipe 22, screwed into a central socket-pipe 8 and formed with lateral holes 24, surrounded by a burner in the form of a truncated conical tube 1 closed at its lower end, can be advantageously used in various constructions of regenerative lamps of the kind adapted to be suspended from above and in which the glass or globe is carried by a hinged ring fixed to the regenerator or other suitable part of the lamp. Fig. 5 shows such an arrangement of central gas-supply pipe and burner, the outer air-tube 14 (shown in Fig. 3) being dispensed with.

To lower the temperature of the hot gases and products of combustion passing from a regenerative lamp, I provide for the admission of a regulated quantity of fresh air. To this end there are formed in the lower portion of the wall of the upper part 7 of the chimney of the lamp a number of holes or passages 27 for the admission of air, which is deflected upward by an annular deflecting-guard 28 of conical or conoidal form, arranged to extend upward within this part of the chimney, as shown in Figs. 1 and 4. In lieu of holes or passages 27 in the chimney the dome-shaped casing 7ª may be formed with a circular row of projections 7ᵇ, upon which the upper part 7 of the chimney and inwardly-turned upper edge of the curtain 26 can rest, as shown in Fig. 6, so as to form a series of passages between the projections, through which passages air will flow from within the curtain 26 in an upward direction and into the chimney, as shown by the arrow.

28 is a deflecting-guard, as before.

What I claim is—

1. In a regenerative lamp, the combination of a base 2, adapted to be carried by a pedestal or other support below it and a removable regenerator supported by said base, the one being provided with a rod and the other with a socket adapted to receive said rod, and a burner comprising a tube carried by said base and through which the support for said regenerator extends from said base, said support being arranged concentric but out of contact with said burner-tube and so as to form therewith an upper annular gas-outlet passage, substantially as herein described.

2. In a regenerative lamp, the combination of a burner comprising a tube without central air-inlet, a base adapted to be connected to a pedestal or other support below it and to carry said burner-tube, a vertical rod extending centrally through said burner-tube but independent thereof and directly carried at its lower end by said base, said rod forming, with the top of said burner-tube, an annular gas-outlet, and a regenerator arranged to rest upon said rod, so as to be capable of being readily lifted therefrom and from said burner-tube, substantially as herein described.

3. In a regenerative lamp, a burner-tube with base adapted to be carried by a pedestal or other support from below, a regenerator supported above said burner-tube and so that its weight is taken directly by said base, but capable of ready removal from above said burner-tube, a glass or globe inclosing said burner-tube and supported solely by said base, and a loose vertically-movable annular cover carried by said glass or globe, fitting said regenerator and arranged to close the space or opening between the top of said glass or globe and said regenerator, substantially as herein described, for the purpose set forth.

4. In a regenerative lamp, a burner-tube of truncated conical form without central air-passage and traversed by a central rod, forming therewith an upper annular gas-outlet, a regenerator located above the upper end of said burner-tube, and an annular downwardly and outwardly curved deflector 9, supported centrally by said regenerator, so as to cover said annular gas-outlet, substantially as herein described.

5. In a regenerative lamp, a truncated conical burner-tube open at its upper end, a regenerator located above said burner-tube, a rod extending through said burner-tube from the bottom thereof and forming with the top of said tube a gas-outlet, a centrally-arranged annular deflector 9, arranged between said burner-tube and said regenerator, so as to cover or overlap the gas-outlet, a closed glass or globe inclosing said burner-tube, and an air-tube in communication with the external atmosphere and with the interior of the glass or globe and surrounding said burner-tube, substantially as herein described, for the purpose specified.

6. In a regenerative lamp, the combination of a conical burner-tube 1, with base 2, a rod 3, directly secured to said base and extending through said burner-tube, so as to form therewith an upper annular gas-outlet, a regenerator 4, 5, and 6, with projection 20, and with a central socket 8, into which said rod can enter, so as to support said regenerator, and a loose vertically-movable annular cover 16, fitting said regenerator, capable of being carried by the lamp-globe and of then closing the opening between the top edge of said globe and the regenerator, the lower end of said socket 8 being flared outward to form a deflector 9, which when in place covers said gas-outlet, substantially as herein described, for the purpose specified.

7. In a regenerative lamp, the combination of a truncated conical burner-tube 1, open at its upper end, a base 2, carrying said burner-tube and adapted to be secured to a pedestal or other support below it, a rod 3, directly secured to said base and extending through but independently of said burner-tube and forming therewith an annular gas-outlet, a regenerator with projection 20 and with a central socket 8, into which said rod 3 can enter, so as to support said regenerator above and independently of said burner-tube, an annular deflector 9, arranged above the upper open end of said burner-tube and carried by said socket 8, a globe 11, supported solely from below and inclosing said burner-tube, a loose vertically-movable annular cover 16, carried by said globe, fitting said regenerator and closing the annular opening between the top edge of said globe and regenerator, and a chimney 7, substantially as herein described.

8. In a regenerative lamp, the combination of a burner-tube 1, having an annular gas-outlet at its upper end, a regenerator arranged above said burner-tube, a rod connecting the base of said burner-tube with said regenerator and forming with said burner-tube an annular gas-box of gradually-increasing cross-sectional area from top to bottom, said gas-box having one or more inlets for gas near its lower end, and a centrally-arranged downwardly and outwardly curved deflector suspended centrally from said regenerator and arranged to cover the annular gas-outlet of said burner-tube, substantially as herein described, for the purposes set forth.

9. In a regenerative lamp, the combination of a burner, a regenerator, a glass or globe inclosing said burner, and a chimney for hot gases and products of combustion, said chimney being constructed or provided with openings 27 near its lower end for admitting cool or comparatively cool air into said chimney, and with an annular curved deflecting-guard 28, arranged within said chimney behind said openings, substantially as described and shown, for the purposes specified.

In testimony whereof I have signed my name to this specification in the presence of two subscribing witnesses.

THOMAS COOPER JOHN THOMAS.

Witnesses:
JAMES STIMPSON MACDONALD,
  46 *Lincoln's Inn Fields, London, W. C.*
WM. THOS. MARSHALL,
  2 *Pope's Head Alley, Cornhill, London, Gentn.*